(12) United States Patent
Osaka et al.

(10) Patent No.: US 7,561,336 B2
(45) Date of Patent: Jul. 14, 2009

(54) MICRO-OPTICAL DEVICE, SPATIAL OPTICAL MODULATOR AND PROJECTOR UTILIZING THE MICRO-OPTICAL DEVICE

(75) Inventors: Takanobu Osaka, Kanagawa (JP); Atsushi Takaura, Tokyo (JP); Kazuhiro Fujita, Tokyo (JP); Kazuya Miyagaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/573,406

(22) PCT Filed: Dec. 8, 2005

(86) PCT No.: PCT/JP2005/023001

§ 371 (c)(1),
(2), (4) Date: Feb. 8, 2007

(87) PCT Pub. No.: WO2006/132004

PCT Pub. Date: Dec. 14, 2006

(65) Prior Publication Data

US 2008/0094718 A1 Apr. 24, 2008

(30) Foreign Application Priority Data

Jun. 10, 2005 (JP) .............................. 2005-171151

(51) Int. Cl.
*G02B 27/10* (2006.01)
*F21S 8/00* (2006.01)
*F21V 5/00* (2006.01)

(52) U.S. Cl. ...................... 359/619; 359/626; 359/628; 359/449; 359/859; 359/853; 362/244; 362/268; 362/327; 348/340

(58) Field of Classification Search ......... 359/619–626, 359/742, 457, 458, 819, 820, 852, 859, 731, 359/449, 528, 542, 547, 548, 893; 362/61, 362/157, 268, 269, 277, 327, 333, 240, 238, 362/241, 244; 348/340, E5.091, E5.141; 343/753, 756, 910; 353/7, 32; 385/146
See application file for complete search history.

(56) References Cited

U.S. PATENT DOCUMENTS 2,967,230 A * 1/1961 Beach et al. ................. 362/269

(Continued)

FOREIGN PATENT DOCUMENTS

JP    10 62606    3/1998

(Continued)

OTHER PUBLICATIONS

Kenjiro Hamanaka, "Components for Supporting Recent Liquid Crystal Projectors", O Plus E, vol. 22, No. 3, pp. 313-318, 2000-3. (with Partial English Translation).

(Continued)

*Primary Examiner*—Loha Ben
(74) *Attorney, Agent, or Firm*—Oblon, Spivak, McClelland, Maier & Neustadt, P.C.

(57) ABSTRACT

A micro-optical device includes a plurality of minute optical elements each having a curved surface operable to condense incident light. The minute optical elements are arranged at constant intervals. The curved surface is expressed by two or more F values. Each of the minute optical elements is a transmission lens element having the curved surface including a substantially flat part at a center of the transmission lens element, wherein the curved surface is convex or concave.

11 Claims, 12 Drawing Sheets

U.S. PATENT DOCUMENTS

| | | | |
|---|---|---|---|
| 3,957,031 A * | 5/1976 | Winston | 126/695 |
| 4,767,172 A * | 8/1988 | Nichols et al. | 385/146 |
| 4,875,064 A * | 10/1989 | Umeda et al. | 353/78 |
| 5,068,768 A * | 11/1991 | Kobayashi | 362/539 |
| 5,173,810 A * | 12/1992 | Yamakawa | 359/819 |
| 6,369,949 B1 * | 4/2002 | Conley | 359/619 |
| 6,507,441 B1 * | 1/2003 | Eisenberg et al. | 359/627 |
| 6,639,733 B2 * | 10/2003 | Minano et al. | 359/728 |
| 6,714,349 B2 * | 3/2004 | Nam | 359/457 |
| 6,856,366 B2 * | 2/2005 | Matsushita et al. | 349/113 |
| 6,871,982 B2 * | 3/2005 | Holman et al. | 362/331 |
| 7,072,096 B2 * | 7/2006 | Holman et al. | 359/298 |
| 7,233,439 B2 * | 6/2007 | Shimizu | 359/456 |
| 7,286,296 B2 * | 10/2007 | Chaves et al. | 359/641 |
| 7,457,036 B2 * | 11/2008 | Wood | 359/454 |
| 2008/0111948 A1 * | 5/2008 | Epstein et al. | 349/64 |
| 2008/0112184 A1 * | 5/2008 | Epstein et al. | 362/600 |

FOREIGN PATENT DOCUMENTS

| | | |
|---|---|---|
| JP | 11 258585 | 9/1999 |
| JP | 2000 137246 | 5/2000 |
| JP | 2003 248189 | 9/2003 |
| JP | 2004 246278 | 9/2004 |
| JP | 2004 264353 | 9/2004 |
| JP | 2004 326052 | 11/2004 |

OTHER PUBLICATIONS

E. G. Colgan, et al., "On-Chip Metallization Layers for Reflective Light Valves", IBM J. Res. Develop., vol. 42, No. 3/4, pp. 339-345, 1998.

Tsuruta, "Applied Optics II", Baifukan, pp. 234-240, 1990. (with Partial English Translation).

* cited by examiner x,y: POSITION ON SCREEN

| r/μm | d/μm | sag/μm |
|---|---|---|
| 10 | 7 | 2.86 |
| 15 | 7 | 1.73 |
| 20 | 7 | 1.27 |
| 25 | 7 | 1.00 |
| 30 | 7 | 0.83 |
| 50 | 7 | 0.49 |
| 100 | 7 | 0.25 |
| 200 | 7 | 0.12 |
| 300 | 7 | 0.08 |

FIG.18

| r1/μm | r2/μm | d/μm | F1 | F2 | NUMBER OF RAYS PASSING THROUGH | CONTRAST RATIO (r1 AND r2) | CONTRAST RATIO (r1 ONLY) | CONTRAST RATIO (r2 ONLY) |
|---|---|---|---|---|---|---|---|---|
| 30 | 10 | 1 | 4.1 | 1.4 | 2 | 2.320 | 3.401 | 2.303 |
| 50 | 10 | 1 | 6.9 | 1.4 | 2 | 2.328 | 3.912 | 2.303 |
| 100 | 10 | 1 | 13.8 | 1.4 | 2 | 2.339 | 4.605 | 2.303 |
| 30 | 15 | 1 | 4.1 | 2.1 | 3 | 2.719 | 3.401 | 2.708 |
| 50 | 15 | 1 | 6.9 | 2.1 | 3 | 2.727 | 3.912 | 2.708 |
| 100 | 15 | 1 | 13.8 | 2.1 | 3 | 2.738 | 4.605 | 2.708 |
| 30 | 16 | 1 | 3.8 | 2.2 | 3 | 2.783 | 3.401 | 2.773 |
| 25 | 20 | 1 | 4.1 | 2.8 | 4 | 2.999 | 3.219 | 2.996 |
| 30 | 17 | 1 | 4.1 | 2.3 | 4 | 2.842 | 3.401 | 2.833 |
| 30 | 20 | 1 | 4.1 | 2.8 | 4 | 3.002 | 3.401 | 2.996 |
| 50 | 20 | 1 | 6.9 | 2.8 | 4 | 3.010 | 3.912 | 2.996 |
| 100 | 20 | 1 | 13.8 | 2.8 | 4 | 3.022 | 4.605 | 2.996 |
| 30 | 25 | 1 | 4.1 | 3.4 | 5 | 3.222 | 3.401 | 3.219 |
| 50 | 25 | 1 | 6.9 | 3.4 | 5 | 3.230 | 3.912 | 3.219 |
| 100 | 25 | 1 | 13.8 | 3.4 | 5 | 3.241 | 4.605 | 3.219 |
| 50 | 30 | 1 | 6.9 | 4.1 | 5 | 3.409 | 3.912 | 3.401 |
| 50 | 35 | 1 | 6.9 | 4.8 | 4 | 3.561 | 3.912 | 3.555 |
| 30 | 10 | 3 | 4.1 | 1.4 | 2 | 2.461 | 3.401 | 2.303 |
| 50 | 10 | 3 | 6.9 | 1.4 | 2 | 2.535 | 3.912 | 2.303 |
| 100 | 10 | 3 | 13.8 | 1.4 | 2 | 2.635 | 4.605 | 2.303 |
| 30 | 15 | 3 | 4.1 | 2.1 | 3 | 2.808 | 3.401 | 2.708 |
| 50 | 15 | 3 | 6.9 | 2.1 | 3 | 2.882 | 3.912 | 2.708 |
| 100 | 15 | 3 | 13.8 | 2.1 | 3 | 2.982 | 4.605 | 2.708 |
| 30 | 20 | 3 | 4.1 | 2.8 | 4 | 3.054 | 3.401 | 2.996 |
| 50 | 20 | 3 | 6.9 | 2.8 | 4 | 3.128 | 3.912 | 2.996 |
| 100 | 20 | 3 | 13.8 | 2.8 | 4 | 3.228 | 4.605 | 2.996 |
| 30 | 25 | 3 | 4.1 | 3.4 | 4 | 3.245 | 3.401 | 3.219 |
| 50 | 25 | 3 | 6.9 | 3.4 | 4 | 3.319 | 3.912 | 3.219 |
| 100 | 25 | 3 | 13.8 | 3.4 | 4 | 3.419 | 4.605 | 3.219 |
| 30 | 10 | 5 | 4.1 | 1.4 | 2 | 2.743 | 3.401 | 2.303 |
| 50 | 10 | 5 | 6.9 | 1.4 | 2 | 2.948 | 3.912 | 2.303 |
| 100 | 10 | 5 | 13.8 | 1.4 | 2 | 3.225 | 4.605 | 2.303 |
| 30 | 15 | 5 | 4.1 | 2.1 | 3 | 2.986 | 3.401 | 2.708 |
| 50 | 15 | 5 | 6.9 | 2.1 | 3 | 3.190 | 3.912 | 2.708 |
| 100 | 15 | 5 | 13.8 | 2.1 | 3 | 3.468 | 4.605 | 2.708 |
| 30 | 20 | 5 | 4.1 | 2.8 | 4 | 3.158 | 3.401 | 2.996 |
| 50 | 20 | 5 | 6.9 | 2.8 | 4 | 3.363 | 3.912 | 2.996 |
| 100 | 20 | 5 | 13.8 | 2.8 | 4 | 3.641 | 4.605 | 2.996 |
| 30 | 25 | 5 | 4.1 | 3.4 | 5 | 3.292 | 3.401 | 3.219 |
| 50 | 25 | 5 | 6.9 | 3.4 | 5 | 3.497 | 3.912 | 3.219 |
| 100 | 25 | 5 | 13.8 | 3.4 | 5 | 3.774 | 4.605 | 3.219 |
| 25 | 20 | 5 | 3.4 | 2.8 | 4 | 3.085 | 3.219 | 2.996 |
| 25 | 20 | 6 | 3.4 | 2.8 | 3 | 3.124 | 3.219 | 2.996 |

MICRO-OPTICAL DEVICE, SPATIAL OPTICAL MODULATOR AND PROJECTOR UTILIZING THE MICRO-OPTICAL DEVICE

TECHNICAL FIELD

The present invention relates to a micro-optical device including a micro-lens array, a micro-mirror (minute concave mirror) array and the like, a spatial optical modulator and a projector for displaying an image where the micro-optical device is used.

BACKGROUND ART

The micro-optical device such as a micro-lens which is a minute lens, a micro-lens array where plural micro-lenses are arranged, a micro-mirror which is a minute mirror, a micro-mirror array where plural micro-mirrors are arranged and the like have played an important roll since the micro-optical devices are born around 1970 to the present.

As for an image displaying device utilizing the micro-optical device, there is a liquid crystal projector enabling image projection by a spatial optical modulator where a micro-lens array is disposed on the light injection side. The micro-lens array is formed by assembling plural micro-lenses which are a kind of a minute optical element.

The spatial optical modulator is configured to include plural spatial optical modulating elements assembled, having an aperture or a reflection part. In the spatial optical modulator, a light injected to the aperture or the reflection part of the spatial optical modulating elements is modulated by being transmitted or reflected.

In the liquid crystal projector, it is desirable that a projection image can be clearly viewed even in a bright place. As for the configuration for this, the micro-lens array is configured to oppose a pixel array of the transmission liquid crystal optical modulator in order to improve a numerical aperture and an efficiency of optical utilization (For example, see Non Patent Document 1).

Moreover, there is a liquid crystal projector where a reflection spatial optical modulator is utilized in the same way as the above described projector. It is one of the characteristics of the reflection spatial optical modulator that the numerical aperture thereof can be increased greater than the numerical aperture of the transmission liquid crystal spatial optical modulator. Thus, the pixel size can be reduced. There is another merit such that the micro-lens is not necessary for improving the numerical aperture and the optical utilization ratio. Such a reflection liquid crystal spatial optical modulator is made using a semiconductor manufacturing process by forming, in order, an electrical circuit for driving, a pixel electrode, a liquid crystal layer and the like on s Si substrate (for example, see Non Patent Documents 2 and Patent Document 1).

These are also called LYCOS (Liquid Crystal on Si) since the liquid crystal is disposed on the Si substrate.

Furthermore, another configuration is also suggested such that the pixel array of the reflection spatial optical modulator is disposed to oppose the micro-lens array for realizing high-performance such as improving the efficiency of the optical utilization, the numerical aperture, and the like (for example, see Patent Document 2).

As for the projector, a contrast ratio can be given as a barometer of the projector.

The contrast ratio is expressed by a luminosity ratio (bright state/dark state) between an image displayed in the bright state and the image displayed in the dark state. The bright state and the dark state are switched by a switching function of the liquid crystal.

The higher the contrast ratio is, the higher the performance is. Accordingly, a projector utilizing a reflection spatial optical modulator with a high contrast ratio is desired in the market.

In the projector utilizing the transmission spatial optical modulator and the reflection spatial optical modulator including the micro-lens array, the contrast ratio may be decreased due to a change of a polarization state. However, in the transmission spatial optical modulator, the linearly polarized light passes through the micro-lens only once. Moreover, the polarization state undergoes a change also only once.

On the contrary, in the reflection spatial optical modulator where the micro-lens array is disposed, the linearly polarized light passes through the micro-lens twice, i.e., back and forth. In other words, the probability of the change of the polarization state occuring may be twice as much as in the transmission spatial optical modulator. According to this, from the view of the contrast ratio, the transmission spatial optical modulator is superior to the reflection spatial optical modulator.

As for the size (or height) of the contrast ratio, the polarization state of the light coming and going in the projector is associated with the size (or height) of the contrast ratio.

In the projector, non polarized light projected from a white light source such as an ultra-high pressure mercury lamp is separated into two linearly polarized lights, i.e., polarized lights P and S by a polarization changing optical system.

It is known that when the separated linearly polarized lights are projected onto a screen via a projection lens, coming and going in the optical system in the projector without vitiating the polarization state, the high contrast ratio can be expected (as for the change of the polarization state, see Non Patent Document 3).

[Patent Document 1] Japanese Patent Application Publication No. 2000-137246
[Patent Document 2] Japanese Patent Application Publication. No. 11-258585
[Non Patent Document 1] Kenjiro Hamanaka, O PLUS E, 2000-3, Vol. 2, Vol. 3, and pp. 313 through 318
[Non Patent Document 2] E. G. Colgan, M. Uda, IBM J. RES. DEVELOP. VOL. 42. NO.3/4, 1998, and pp. 339 through 345
[Non Patent Document 3] Kunio Tsuruta, Applied Optics II, Baifukan, and pp. 234 through 240

However, if the polarization state is vitiated, which influences the contrast ratio in the optical system (for example, a principal axis of the polarization, an elliptical polarization, and depolarization), the light is permeated through in the dark state resulting in a factor of vitiating the contrast ratio.

The polarized light P may be converted to the polarized light S in the optical system (On the contrary, the polarized light S may be converted to the polarized light P). This is an intentional change of the polarization state. Thus, this is discriminated from the above described undesirable change of the polarization state.

When the micro-lens array is positioned to oppose the pixel (electrode) array of the liquid crystal reflection spatial optical modulator, the principal axis of the linearly polarized light is rotated in the micro-lens array. Further, if a reflection preventing layer is provided, the change of the polarization state is caused such as the elliptical polarization.

The change becomes conspicuous when the incident angle is great. Further, in the optical system of the liquid crystal projector where the liquid crystal reflection spatial optical modulator is used, since a polarization beam splitter is provided ahead of the liquid crystal reflection spatial optical modulator, if the polarization state is changed, the light is not rigidly separated in response to the polarization (the polarized lights P and S). Thus, even in the dark state, the light reaches the screen. Accordingly, the contrast ratio may be reduced.

On the other hand, in addition to the contrast ratio, a high definition of the image can be given as the performance barometer of the liquid crystal projector. This is expressed by a pixel size and a number of pixels. The smaller the pixel size is and the more the number of the pixels is, it can be said that the higher the definition of the image is realized.

It is true that the reflection liquid crystal spatial optical modulator is superior to the transmission liquid crystal spatial optical modulator in reducing the pixel size, but the reduction of the pixel size is regulated by the semiconductor manufacturing process at the moment.

Accordingly, an object is given to realize a reduction of the pixel size without being regulated by the semiconductor manufacturing process.

DISCLOSURE OF THE INVENTION

It is a feature of the present invention to provide a micro-optical device and a spatial optical modulator enabling reducing a change of the polarization state.

In a preferred embodiment of the present invention is provided a micro-optical device configured as an array structure where the change of the polarization state is reduced, and the loss and the abberations due to the reflection on the interface are kept under control.

According to one aspect of the present invention a projector is provided having a high contrast ratio where the change of the polarization state is reduced.

In an embodiment of the present invention is provided a projector of high-definition having a high contrast ratio.

To achieve these and other advantages in accordance with the purpose of the invention, the invention provides a micro-optical device including plural minute optical elements each having a curved surface operable to condense incident light. The minute optical elements are arranged at constant intervals. The curved surface is expressed by two or more F values.

According to at least one of the embodiments of the present invention, the change of the polarization state mainly caused by a rotation of a principal axis of polarization becomes great when a linearly polarized light is injected to an injection surface having a large incident angle. In a case such that the incident angle is fixed, the polarization state on a curved surface is changed greater than the polarization state on a flat surface. That is, the present invention takes notice that the change of the polarization state can be reduced on a flat surface. Thus, a substantially flat surface is formed on the curved surface of the minute optical elements. Accordingly, the change of the polarization can be reduced. Further, the curved shape left unchanged maintains a light condensing function. Moreover, two or more F values are used to express the curved surface. The micro-lens having a large F value improves a contrast ratio. On the other hand, the micro-lens having a small F value maintains the light condensing function and improves the efficiency of optical utilization.

According to at least one of the embodiments of the present invention, it is possible to reduce the change of the polarization and improve the efficiency of the optical utilization by the micro-lens array. Accordingly, the spatial optical modulator can be obtained, enabling a high contrast ratio and a high efficiency of the optical utilization.

According to at least one of the embodiments of the present invention, it is possible to reduce the change of the polarization and improve the efficiency of the optical utilization by a minute concave mirror. Accordingly, the spatial optical modulator can be obtained, enabling a high contrast ratio and a high efficiency of the optical utilization.

According to at least one of the embodiments of the present invention, it is possible to realize a high contrast ratio and a high efficiency of the optical utilization by the spatial optical modulator. Accordingly, it is possible to provide a projector enabling a high contrast ratio and high efficiency of the optical utilization.

BRIEF DESCRIPTION OF THE DRAWINGS

FIGS. 4A and 14B are pattern views illustrating a configuration where plural F values of the lens elements used in a seventh embodiment of the present invention are set. FIG. 14B shows a shielding part viewed from the optical axis;

FIG. 18 is a table showing a result of evaluating parameters by performing a ray tracing on six rays.

BEST MODE FOR CARRYING OUT THE INVENTION

In the following, embodiments of the present invention will be described with reference to the accompanying drawings.

First Embodiment

Figure 1:
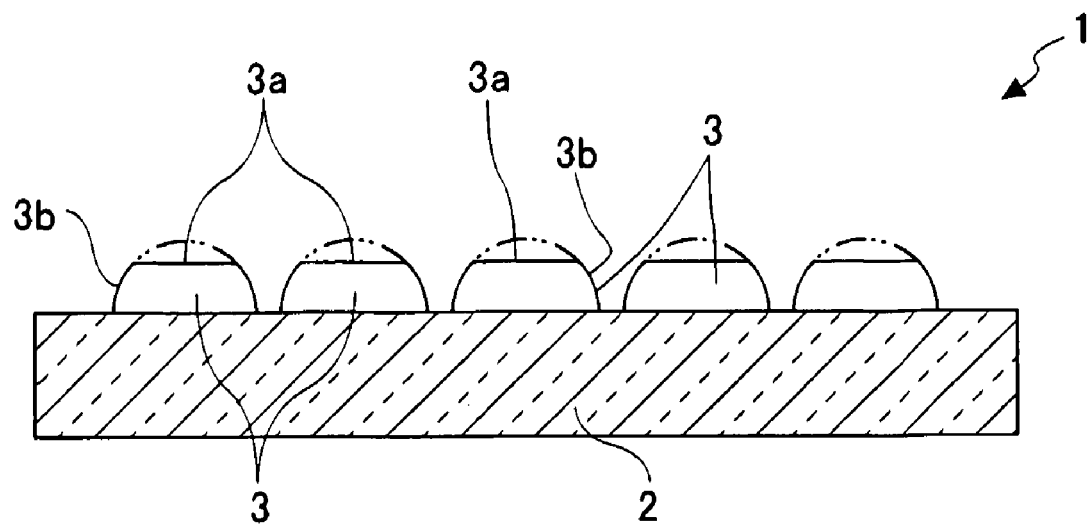
FIG. 1 is a cross-sectional pattern view illustrating a configuration example of a micro-lens array according to a first embodiment of the present invention.

With reference to FIG. 1, a description is given of a first embodiment of the present invention.

FIG. 1 is a cross-sectional pattern view illustrating a configuration example of a micro-lens array 1 which is a micro-optical device according to the first embodiment of the present invention.

The micro-lens array 1 according to the present embodiment configured to be unified with a translucent array substrate 2 such as glass, transparent resin and the like includes plural micro-lenses 3 arranged at constant intervals. The micro-lenses 3 are minute optical elements having a light condensing function with respect to the incident light according to a convex curved shape thereof. The micro-lens array 1 of the present embodiment is characterized such that each of the micro-lenses 3 of the micro-lens array 1 has substantially a flat part 3a in a part including the top of the curved shape so that each of the micro-lenses 3 is configured to include the flat part 3a at a center thereof and a curved part 3b around the flat part 3a. That is, the flat part 3a forms a flat surface against an incident light.

Generally, a principal axis is rotated excluding a case of vertical incidence, and the extent thereof depends on an incident angle. When a light is injected to a spherical lens, as the light goes from the top of the lens to the surrounding parts, the incident angle becomes greater. However, in a case of a flat surface, the incident angle dose not change, and thus, the rotation of the principal axis can be kept small.

Accordingly, each of the micro-lenses 3 includes the flat part 3a forming substantially a flat surface against the incident light, which contributes to a reduction of the change of the polarization state. It should be noted that in a case of a configuration of a flat surface where the entire micro-lenses 3 comprise a completely flat part, the change of the polarization state is kept small. However, an intrinsic light condensing effect by the micro-lenses 3 cannot be expected. Accordingly, effects such as an improvement of the optical utilization ratio, the numerical aperture, image quality, and a reduction of pixel size described below are not hoped for.

In regard to this point, the light condensing function of the micro-lenses 3 is maintained by a curved part 3b provided around the flat part 3a.

That is, in the present embodiment, a part of the spherical surface is flattened to be the flat part 3a, and the intrinsic light condensing function is partially vitiated. However, the light condensing function of the micro-lenses 3 is sacrificed within the limits of tolerance so as to reduce the change of the polarization state as small as possible and improve the contrast ratio.

Accordingly, the micro-lens array 1 including the flat part 3a can be easily produced.

When the material of the micro-lens array 1 is glass, the micro-lens array 1 is produced according to a method of, for example, mainly a photo lithography technology and a dry etching technology disclosed in Japanese Laid-Open Patent Application Publication No. 6-194502 and Japanese Laid-Open Patent Application Publication No. 6-250002.

When producing the micro-lenses 3 including the flat part 3a from spherical micro-lenses, it is possible to flatten the top of the micro-lenses by polishing.

When CMP is used as a polishing technology, it is possible to correspond to a mass production. Thus, production cost can also be reduced. In addition, roughness of the surface can be kept less so as to fashion optically problem-free micro-lenses.

A description is given of a method of forming the flat part without polishing the micro-lenses. First, a photomask including a desired flat part is produced. Then, by a spin coater, resist is applied on the substrate 2 on which the micro-lenses are provided. When patterning of the resist according to the photo lithography, the micro-lenses including the flat part 3a are produced. In this case, it is possible to form a flat part not only at a top of the lenses but also at a surrounding of the lenses. Moreover, it is possible to provide flat parts at both the top and the surrounding of the lenses. Accordingly, it is possible to design with high flexibility.

Second Embodiment

Figure 2:
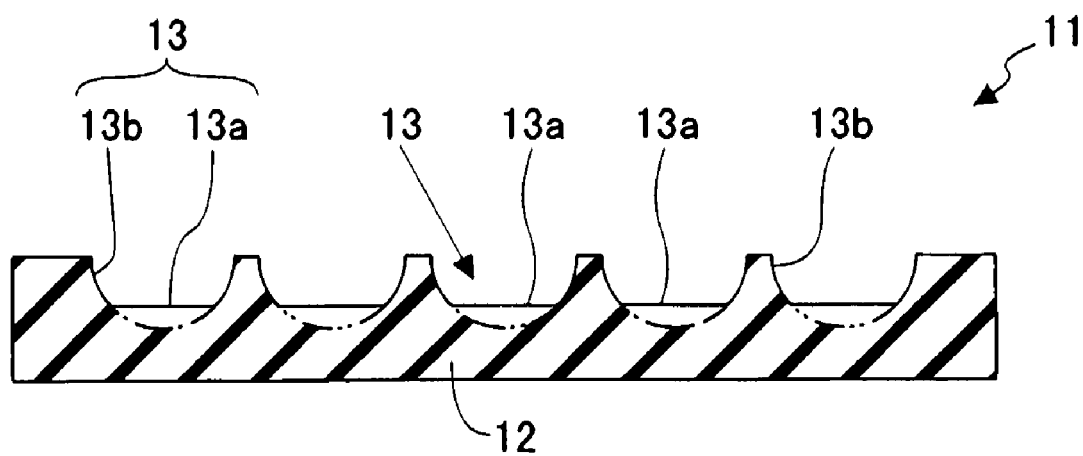
FIG. 2 is a cross-sectional pattern view illustrating a configuration example of a micro-mirror array according to a second embodiment of the present invention.

With reference to FIG. 2, a description is given of a second embodiment of the present invention.

FIG. 2 is a cross-sectional pattern view illustrating a configuration example of a micro-mirror array (a minute convex mirror array) 11 which is a micro-optical device according to the second embodiment of the present invention.

The micro-mirror array 11 according to the present embodiment is, for example, configured to be a mirror where plural micro-mirrors 13 are arranged at constant intervals on a dielectric substrate 12 such as $SiO_2$, and a metal foil layer such as Al is evaporated on the surface of the micro-mirrors 13. The micro-mirrors 13 are micro-optical devices having a light condensing function with respect to an incident light according to a concave curved surface thereof.

The micro-mirror array 11 according to the present embodiment features including each of the micro-mirrors 13 configured to include a flat part 13a at a part including a curved bottom and a curved part 13b around the flat part 13a compared to a conventional spherical shape as shown by virtual lines in FIG. 2. That is, the flat part 13a is configured to be even against the incident light.

Generally, the rotation of the principal axis is caused by a linearly polarized light injected to a surface, forming an angle.

Accordingly, even if the incident angle is fixed, when the surface is curved to which the light is injected, the rotation of the principal axis becomes greater. On the contrary, if the surface is flat, the rotation of the principal axis becomes smaller.

Therefore, since each of the micro-mirrors 13 has the flat part 13a configured to be even against the incident light, this contributes to a reduction of the change of the polarization state. It should be noted that in a case of a configuration of a flat surface where the entire micro-mirrors 13 comprise a completely flat part, the change of the polarization state is kept small. However, an intrinsic light condensing effect by the micro-mirrors 13 cannot be expected. Accordingly, effects such as an improvement of the optical utilization ratio, the numerical aperture, image quality, and a reduction of pixel size described below are not hoped for.

In regard to this point, the light condensing function of the micro-mirrors 13 is maintained by a curved part 13b provided around the flat part 13a.

In the present embodiment, as a part of the spherical surface is flattened to be the flat part 13a, the intrinsic light condensing function is partially vitiated. However, the light condensing function of the micro-mirrors 13 is sacrificed within the limits of tolerance so as to reduce the change of the polarization state as small as possible and improve the contrast ratio.

Third Embodiment

Figure 3:
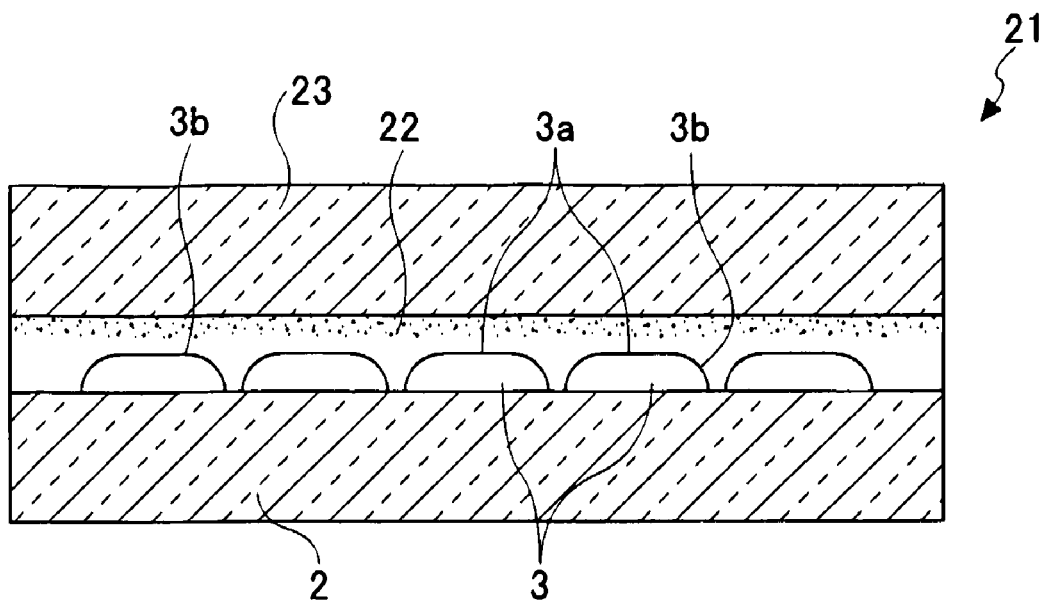
FIG. 3 is a cross-sectional pattern view illustrating a configuration example of a micro-lens array according to a third embodiment of the present invention.

With reference to FIG. 3, a description is given of a third embodiment of the present invention.

FIG. 3 is a cross-sectional pattern view illustrating a configuration example of a micro-lens array 21 which is a micro-optical device according to the present embodiment. The micro-lens array 21 according to the present embodiment is based on the configuration of the micro-lens array 1 according to the first embodiment of the present invention. On the micro-lens array 21, a flat layer 23 is mounted via an adhesive layer 22 including a material different from the micro-lens 3. Accordingly, the micro-lens array 21 is configured to include both sides flat. As for the flat layer 23, a translucent member such as glass is used as a cover glass.

More specifically, for example, the substrate 2 including micro-lenses 3 is made of glass having a refractive index of 1.54. As for the adhesive layer 22, an adhesive having a refractive index of 1.42 is used. As for the flat layer 23, a cover glass having a refractive index of 1.52 is used. The difference is small between the refractive index of the substrate 2 including the micro-lenses 3 and the refractive index of the adhesive layer 22. Thus, it is possible to reduce optical loss according to an interface of the two indexes in comparison to the interface between the glass (refractive index of 1.54) and the air (refractive index of 1.0). It is true that the light condensing function is sacrificed, but spherical aberration can also be reduced. Therefore, the efficiency of the optical utilization can be improved. As for an adhesive of the adhesive layer 22, for example, ultraviolet curing resin can be used. In addition to this, if the elements are configured to include the flat layer 23 of a cover glass, for example, it is possible to position the pixel array of the reflection liquid crystal spatial optical modulator easily.

Fourth Embodiment

Figure 4:
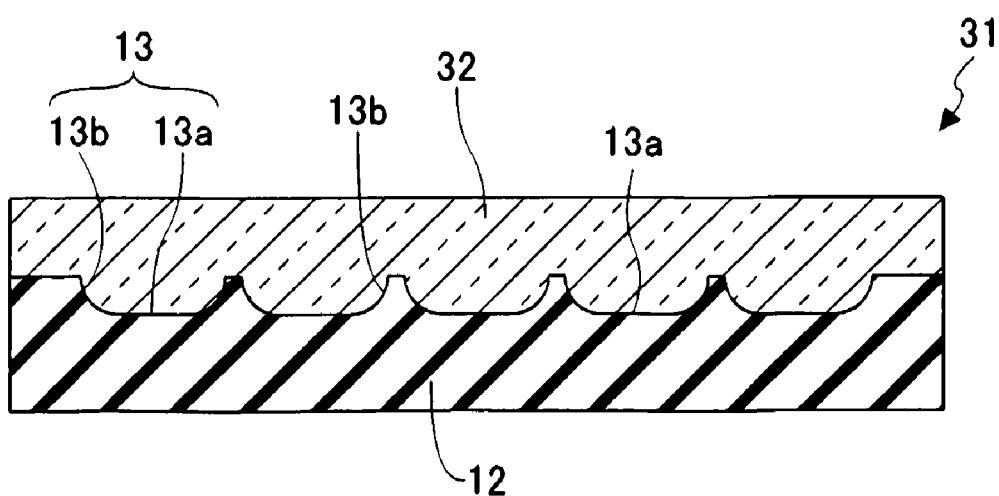
FIG. 4 is a cross-sectional pattern view illustrating a configuration example of a micro-mirror array according to a fourth embodiment of the present invention.

With reference to FIG. 4, a description is given of a fourth embodiment of the present invention. FIG. 4 is a cross-sectional pattern view illustrating a configuration example of a micro-mirror array 31 which is a micro-optical device according to the present embodiment. The micro-mirror array 31 according to the present embodiment is based on the configuration of the micro-mirror array 11 according to the second embodiment of the present invention. On a side where a concave curved shape (micro-mirror 13) is provided, a translucent member is applied and a surface thereof is flattened so as to form a flat layer 32. The filling in with the flat layer 32 is performed according to a film performing method such as spattering. Further, as for a material for the flat layer 32, materials which can be evaporated, for example, materials with low refractive index such as $SiO_2$, MgO, and the like, or materials with high refractive index such as $ZrO_2$, ZnO and the like can be used. At this moment, the concave curved shape is copied, and thus, hollows are generated even after the translucent member is applied. This can be flattened by chemical mechanical polishing (CMP).

According to a configuration of the micro-mirror array 31 of the present embodiment, the light having an angle excluding vertical (the light having a lighting angle) injected into the micro-mirror array 31 can be reflected to a direction where the angle thereof becomes smaller in accordance with Snell's Law. Since the light can be reflected by the micro-mirror 13 at a smaller lighting angle, the light condensing characteristic of the micro-mirror 13 can be improved. Accordingly, the efficiency of optical utilization can be improved.

Fifth Embodiment

Figure 5:
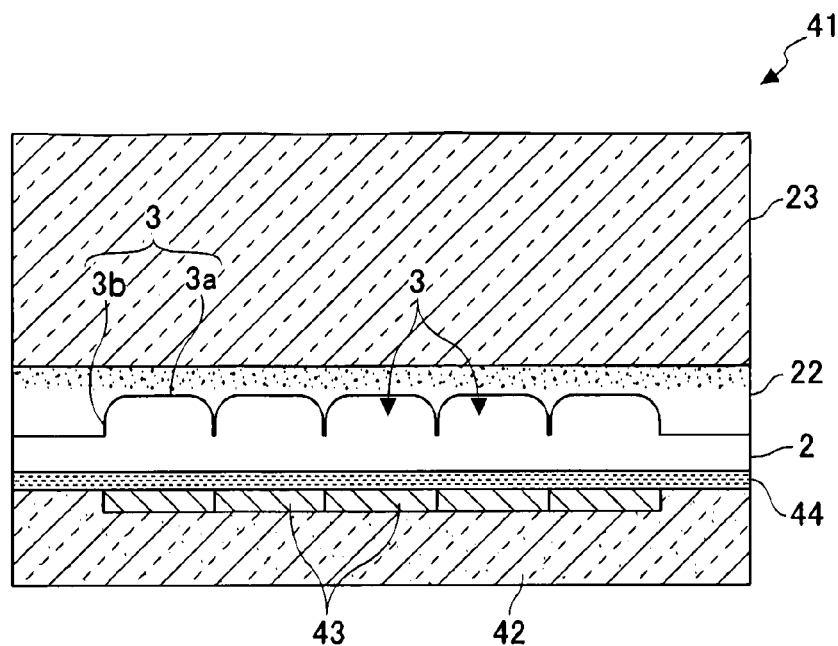
FIG. 5 is a cross-sectional pattern view illustrating a configuration example of a reflection liquid crystal spatial optical modulator according to a fifth embodiment of the present invention.

With reference to FIG. 5, a description is given of a fifth embodiment of the present invention. FIG. 5 is a cross-sectional pattern view illustrating a configuration example of a reflection liquid crystal spatial optical modulator 41 which is a spatial optical modulator for displaying an image according to the present embodiment.

The reflection liquid crystal optical modulator 41, as described in the third embodiment, features using the micro-lens array 21 including the flat layer 23. The micro-lens array 21 is mounted on a liquid crystal layer 44 including pixel electrodes 43 formed on a Si substrate 42.

In the micro-lens array 21, each of the micro-lenses 3 is arranged corresponding to a position of a corresponding one of the pixel electrodes 43. The pixel electrodes 43 and the micro-lenses 3 specifically correspond to, for example, XGA standard so as to be arranged as a two-dimensional array of 1,024×768 dots.

According to the reflection liquid crystal spatial optical modulator 41 of the present embodiment, since the micro-lens array 21 is used for enabling a reduction of the change of the polarization and an improvement of the efficiency of the optical utilization, it is possible to provide a reflection liquid crystal spatial optical modulator realizing a high contrast ratio and high efficiency of optical utilization.

Sixth Embodiment

Figure 6:
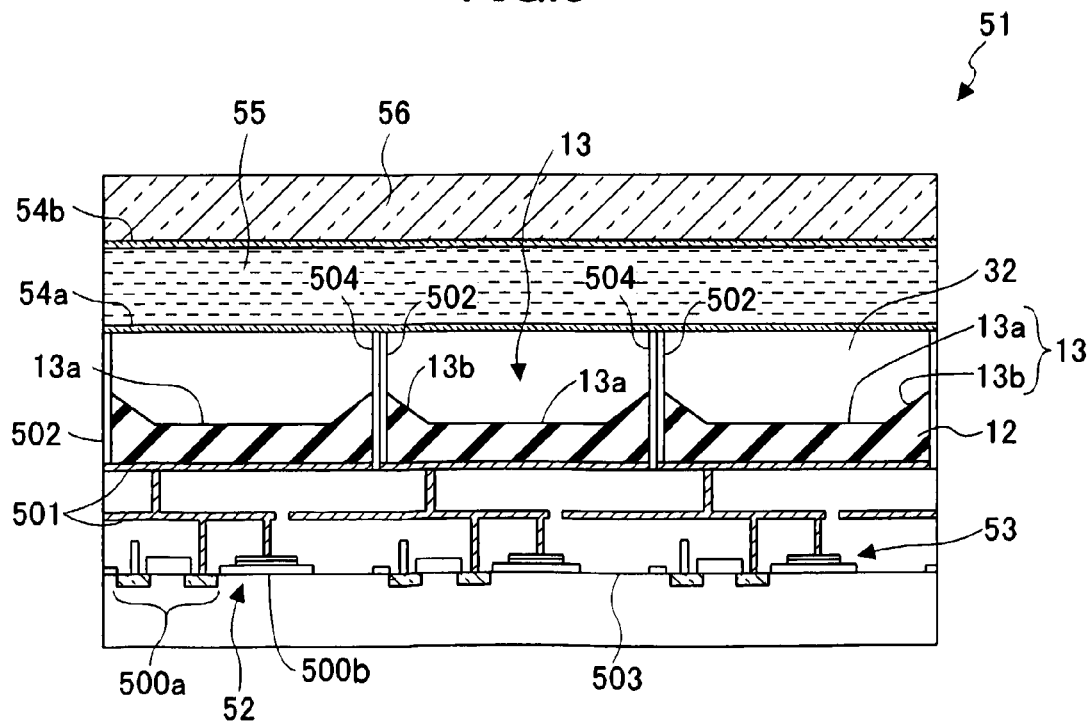
FIG. 6 is a cross-sectional pattern view illustrating a configuration example of a reflection liquid crystal spatial optical modulator according to a sixth embodiment of the present invention.

With reference to FIG. 6, a description is given of a sixth embodiment of the present invention. FIG. 6 is a cross-sectional pattern view illustrating a configuration example of a reflection liquid crystal spatial optical modulator 51 which is a spatial optical modulator for displaying an image according to the present embodiment.

The reflection liquid crystal spatial optical modulator 51 features using a micro-mirror array 31 including, for example, a flat layer 32 as described in the fourth embodiment. The micro-mirror array 31 is mounted on a Si substrate 53 where an electric circuit part 52 such as a transistor for driving liquid crystal is incorporated. On the flat layer 32, a liquid crystal layer 55 provided between a couple of transparent electrodes 54a and 54b, and a cover glass 56 as a surface layer are formed. The electric circuit part 52 comprises a MOS (Metal Oxide Semiconductor) transistor 500a including a source, a drain, a gate and wirings thereof, and a retention volume 500b.

Moreover, an electrically-conductive shielding layer 501 such as a metal is provided for preventing the light entering from a gap 504 between the micro-mirror arrays 31 from reaching the electric circuit part 52. Furthermore, a dielectric layer 503 is provided between the electric circuit part 52 and the shielding layer 501. The electric circuit part 52 and the transparent electrode 54a are electrically connected via the conductive shielding layer 501 through the through-hole 502.

In a case of the micro-lens array 21 according to the fifth embodiment, it is necessary to position the micro-lenses corresponding to the positions of the array of the pixel electrodes 43. On the other hand, in a case of the micro-mirror array 31 according to the present embodiment, as for a pixel of the liquid crystal spatial optical modulator 51, each of the micro-mirrors 13 of the micro-mirror array 31 can be formed as the pixel thereof. That is, in a case where the micro-mirrors 13 of the micro-mirror array 31 are utilized for the pixel arrangement of the liquid crystal spatial optical modulator 51, as for the production, the micro-mirrors 13 including the flat part 13a are produced in a process where the pixels of the liquid crystal spatial optical modulator 51 are produced.

According to the present embodiment, the micro-mirrors 13 of the micro-mirror array 31 are used as pixels, enabling a reduction of the change of the polarization and an improvement of the efficiency of the optical utilization, so that it is possible to provide a reflection liquid crystal spatial optical modulator 51 realizing a high contrast ratio and high efficiency of optical utilization.

Accordingly, in the micro-optical devices of the above described embodiments, the substantial flat part described as a feature of the configuration includes a case such that a part of the minute optical element is completely flat and a case such that a part of the minute optical element can be considered as flat, even if it is not completely flat. In other words, this is the case where the curvature radius is large in the micro-lens.

Figure 7A:
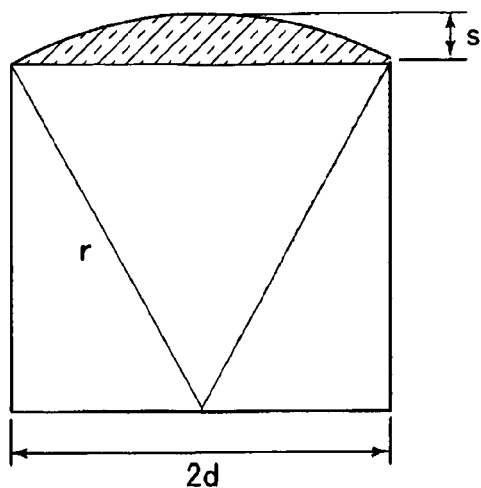
FIGS. 7A and 7B are views illustrating operations of lens elements at a flat part according to the embodiment of the present invention.

FIG. 7A is a cross-sectional view of a micro-lens. Here, a sag s is calculated from a curvature radius r and an effective width of the micro-lens 2d.

Figures 16, 17:
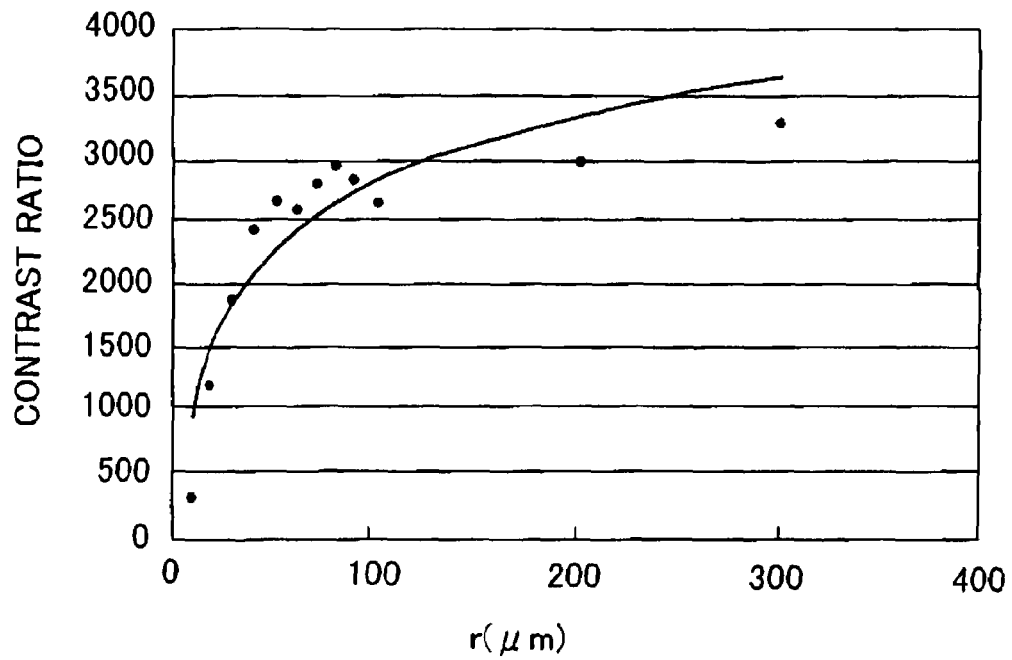
FIG. 16 is a graph illustrating a relationship between a curvature radius of the lens elements used in the embodiment of the present invention and the contrast ratio.
FIG. 17 is a table showing a change of s when r is varied where 2d is predetermined to be equal to 14 μm.

FIG. 17 is a table showing the change of s when r is varied where 2d is predetermined to be equal to 14 μm.

In FIG. 17, as the curvature radius becomes greater, the sag is decreased. Accordingly, the surface of the micro-lens is becoming flat. When the r is equal to 25 μm, the sag is equal to 1 μm. It is defined that the micro-lens is substantially flat when the sag is equal to 1 μm or less.

In FIG. 7A, the r and an entire length of the micro-lens are shown to coincide with each other, but the r and the length of the micro-lens are not limited to the case.

Figure 7B:
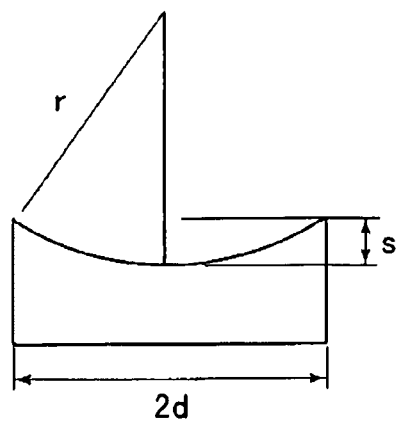

This can be said in the same way as the micro-mirrors. The convex shape of the micro-lens can be replaced by the concave shape of the micro-mirror (FIG. 7B).

Embodiment

Next, a description is given of an embodiment. In the micro-lens array 21 partially including a flat part 3a as above described, the effects of reducing the change of the polarization state, improving the contrast ratio, and maintaining the light condensing function are quantitatively obtained by a ray tracing calculation and checked.

In the present embodiment, first, the ratio between the size (area) of one micro-lens 3 and the size (area) of the flat part 3a (hereinafter, referred to as area ratio) is obtained. Then, the relationship between the area ratio and the contrast ratio is obtained. The shape in a surface vertical to an optical axis of the micro-lenses 3 is a square. The size of the square is 13.2 μm×13.2 μm. Moreover, since the micro-lens has a spherical shape, the cross-sectional shape of the micro-lens perpendicular to the optical axis is circular. Thus, the shape of the flat part 3a is also circular. However, when a diameter of a circle of the flat part 3a becomes greater than a side of the square equal to 13.2 μm, the flat part 3a becomes a shape where the square is cut out from the circle. The curvature radius of the micro-lens 3 is equal to 10 μm. The refractive index of the glass member is equal to 1.54. Further, the refractive index of the resin layer (adhesive layer) 22 is equal to 1.42. The refractive index of the cover glass (flat layer) 23 is equal to 1.52.

[Contrast Ratio]

Figure 8:
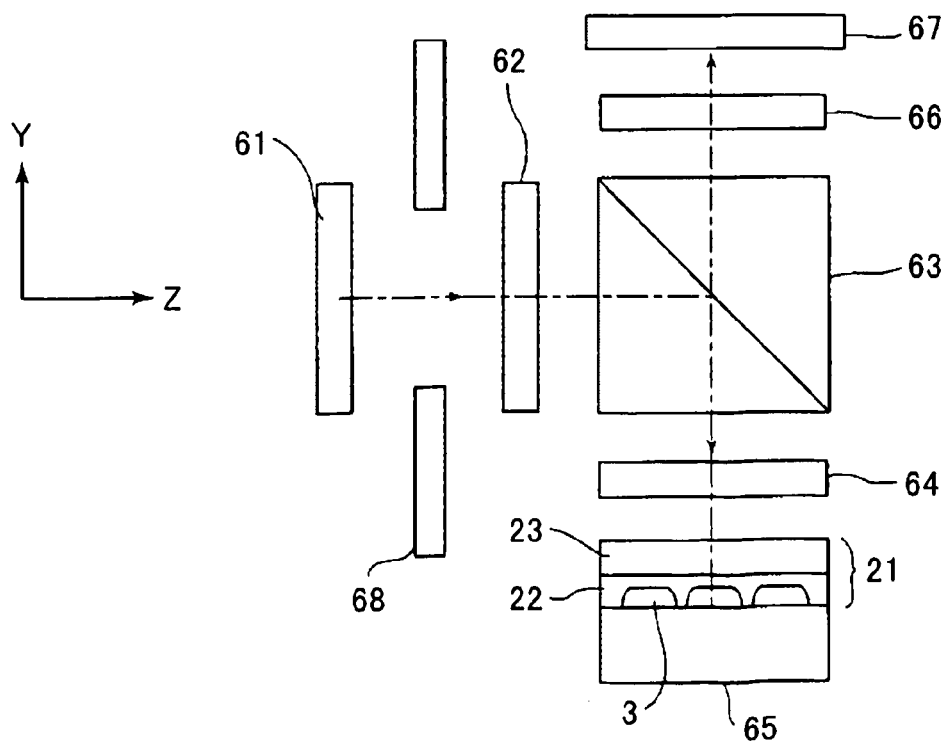
FIG. 8 is a model view illustrating a configuration example of an optical system of a liquid crystal projector provided for performing a ray tracing calculation to obtain a contrast ratio.

In the ray tracing calculation for obtaining the contrast ratio, an optical system model of a liquid crystal projector as shown in FIG. 8 is used.

In FIG. 8, reference numerals are assigned as a light source 61, a linear polarizer 62, a polarization beam splitter 63, a retarder plate 64, a reflection surface (pixel electrode) 65, an analyzer 66, a screen (photo detector) 67 and an aperture 68. The micro-lens array 21 on which the cover glass 23 is mounted via the adhesive layer 22 is positioned between the retarder plate 64 and the reflection surface (pixel electrode) 65. The micro-lenses 3 are positioned so as to oppose a corresponding one of the pixel electrodes of the reflection surface (pixel electrode) 65 (so as to form a reflection liquid crystal spatial optical modulator 41).

Accordingly, the light from the light source 61 attenuated by the aperture 68 is divided into linearly polarized components by the linear polarizer 62 and reflected by the polarization beam splitter 63 in accordance with the polarization direction to a side where the micro-lens array 21 and the reflection surface (pixel electrode) 65 are provided. The reflected light is given luminosity corresponding to a state of the reflection surface (pixel electrode) 65 which is controlled in accordance with the image data. Then, the light is again injected to a side where the polarized beam splitter 63 is provided, transmitted through a polarization split thereof, and projected onto the screen (photo detector) 67 via the analyzer 66. The retarder plate 64 is rotated so as to model the light in the bright state and the light in the dark state. The ratio of modeling the light in the bright state and the light in the dark state is adopted as the contrast ratio. The light source 61 has an orientation distribution.

Figure 9:
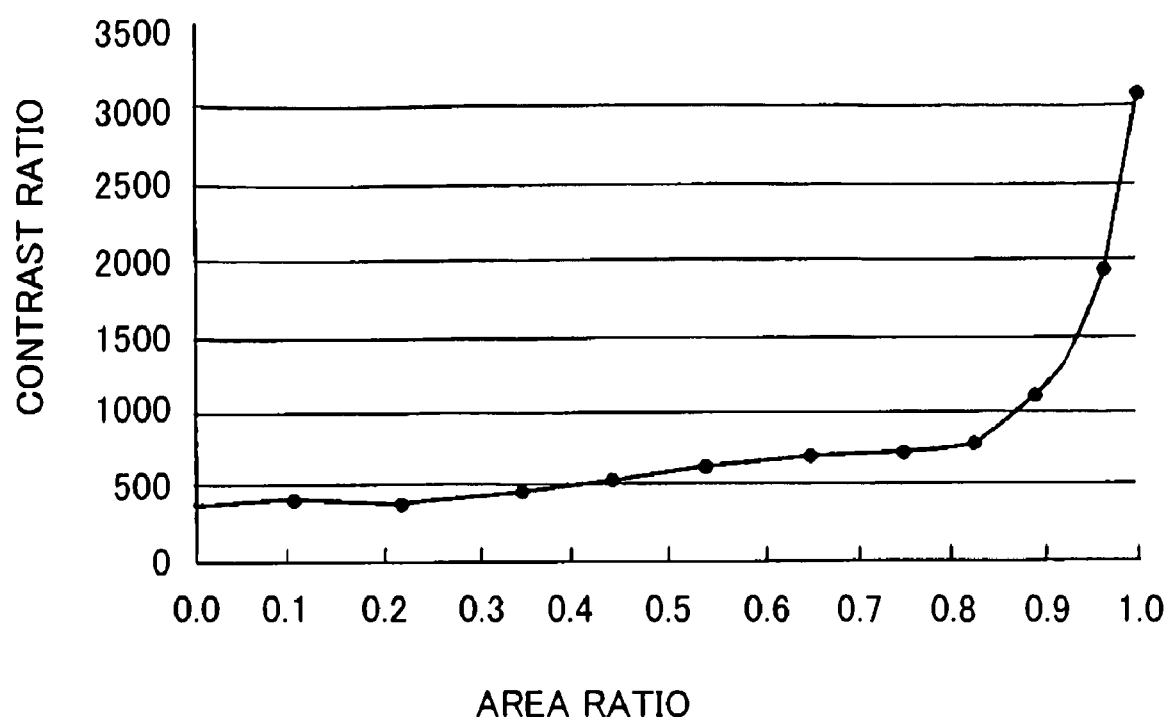
FIG. 9 is a graph illustrating a relationship between an area ratio and the contrast ratio.
Figure 10:
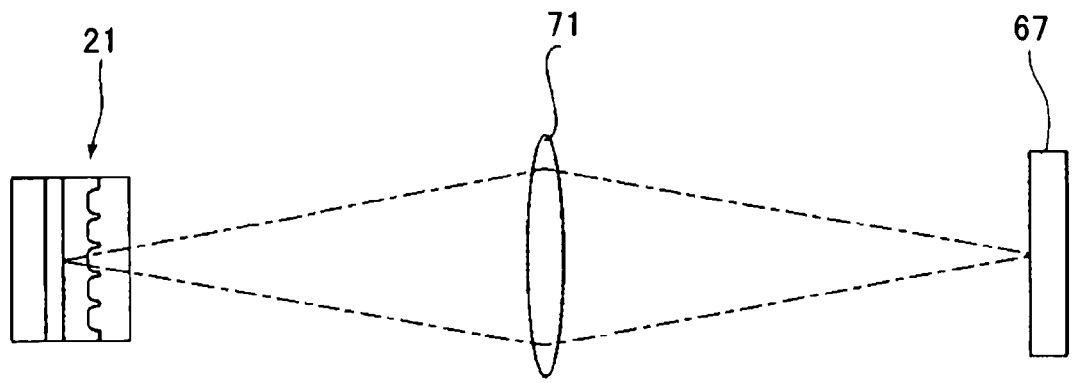
FIG. 10 is a model view illustrating a configuration example of an optical system for performing a ray tracing calculation in respect of evaluating an image of the pixels of the reflection liquid crystal spatial optical modulator projected onto a screen.

FIG. 9 is a graph illustrating a relationship between the area ratio and the contrast ratio.

The horizontal axis is the area ratio, while the vertical axis is the contrast ratio. As shown in the graph, it is obvious that the contrast ratio is improved as the area of the flat part 3a increases.

The improvement of the contrast ratio draws a gentle curve under the area ratio substantially less than or equal to 0.8, but rapidly increases when the area ratio becomes greater than 0.8.

This may be because the rotation of the principal axis around the micro-lens 3 is large.

[Pixel Contraction Profile]

Next, a ray tracing calculation is performed referring to an evaluation of the image of the pixels of the reflection liquid crystal spatial optical modulator 41 projected onto the screen 67.

A projection lens 71 and a screen (photo detector) 67 are provided against the micro-lens array 21 on which the cover glass 23 is mounted via the adhesive layer 22 in the same way as the above described micro-lens array 21.

The MTF (Modulation Transfer Function) of the projection lens 71 is equal to 50%. In this model, a light source is supposed to be provided within the micro-lens array 21.

Figure 11:
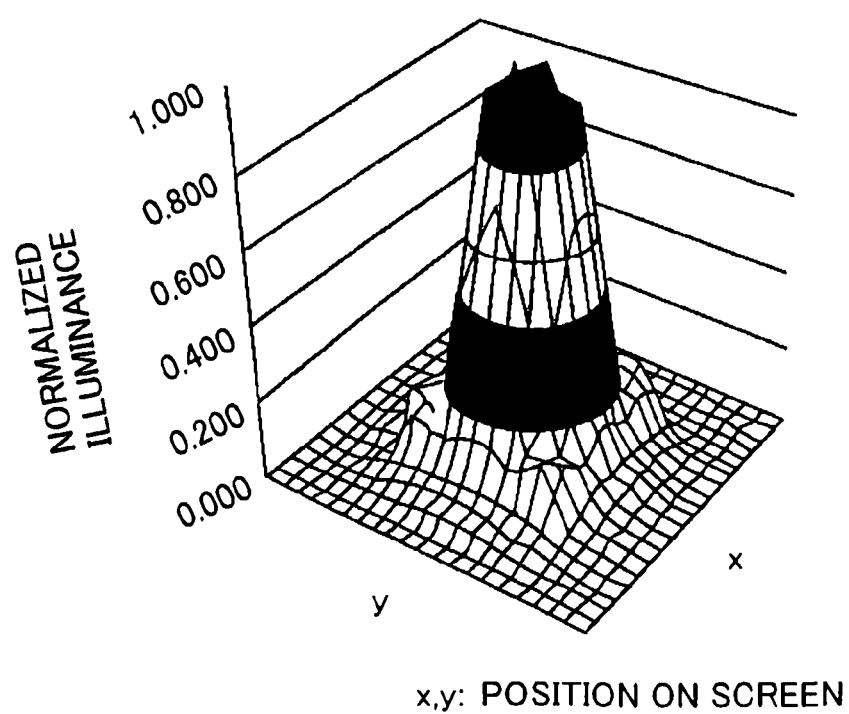
FIG. 11 is a view illustrating an image (projected image) example on the screen corresponding to a case where a pixel is projected.

FIG. 11 is the image (projected image) on the screen 67 corresponding to a case where a pixel is projected.

The horizontal axes (x, y) are defined as a spatial spreading (arbitrary), while the vertical axis is defined as an illuminance (or strength, arbitrary) FIG. 11 shows a result when the area ratio is equal to 0.17.

Hereinafter, the illuminance profile of the projected pixel is referred to as "projected pixel profile." The projected pixel profile is quoted in one axis direction, and one side thereof is plotted. The result is shown by a graph in FIG. 12.

Figure 12:
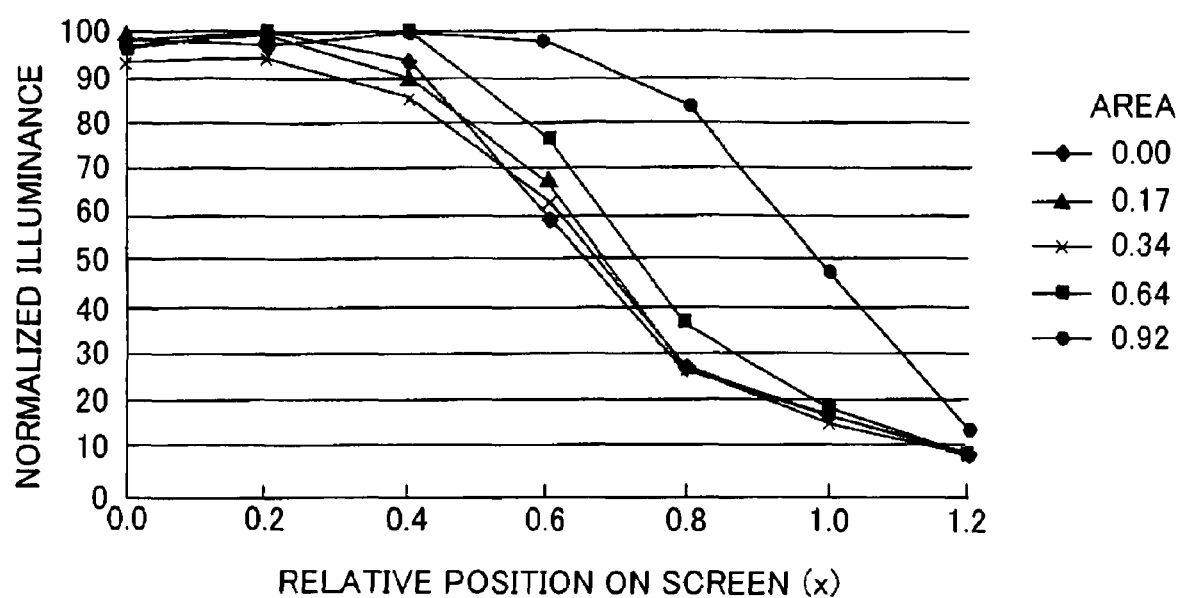
FIG. 12 is a graph showing a result of plotting one side of a projected pixel profile along one axis direction.

In FIG. 12, the projected pixel profiles are shown obtained at five area ratios (0.0, 0.17, 0.34, 0.64 and 0.9).

The projected pixel profiles almost do not vary when the area ratio is less than 0.34. This is because the area around the center of the micro-lens 3 does not influence the light condensing effect very much. However, as the area ratio is equal to 0.64 and 0.92, the width of the projected pixel profile becomes wider. This is because the light condensing effect of the lens is reduced as the area of the flat part 3a increases.

As a result, the contrast ratio is improved substantially 1.23 times greater, i.e., from 358 to 440 in a range where the projected pixel profile does not vary (the area ratio is in a range between 0.0 and 0.34). Further, if permitting a little spread of the projected pixel profile, the contrast ratio is improved substantially 1.8 times greater, i.e., from 358 to 643. Accordingly, the effect of the improvement of the contrast ratio by providing the flat part 3a can be found. In addition, it can be also found that the quality of the projected image is not degraded very much.

In regard to the spread of the projected pixel profile as above described, the result of the present embodiment is compared with the conventional technology below.

A result similar to the present embodiment is disclosed in a document (Takao Endo and others, Selection of Drafts of Lecture Meeting for 28th Optics Symposium (Lecture Meeting of Optical Technology and Science), pp. 21 through 22, published in 2003 by Ouyou Butusri Gakkai Bunkakai of Nihon Kogakkai). The result is on an evaluation of a projected image of pixels of a projector.

In this document, a description is mainly given of a result obtained from an experiment in respect of a projected image of one pixel. According to the description of the result, the reason why one pixel is used is that in a case such that there is an image of the adjacent pixel (in a diagonal direction), in the illuminance, the image profiles, especially foot parts thereof, are piled up, and thus, the evaluation of one pixel cannot be performed accurately. The piled up foot parts of the image profile in this case are equal to 25%, when the maximum illuminance is normalized as 100%. The pixel of a light bulb (spatial optical modulator) is a square, one side thereof being equal to 13.7 μm. Moreover, the spread of the foot parts generated by the optical system of the projector expresses a degradation of the image quality. As the value of the degradation becomes greater, the differentiation between the adjacent pixels becomes ill-defined. Accordingly, the CTF (Contrast Transfer Function) of the image becomes less.

In the present comparison, the piled up foot parts of the projected pixels are evaluated in the same way as the above description when there is an image of an adjacent pixel in the diagonal direction. The result is shown in FIG. 13 (FIG. 12).

Figure 13:
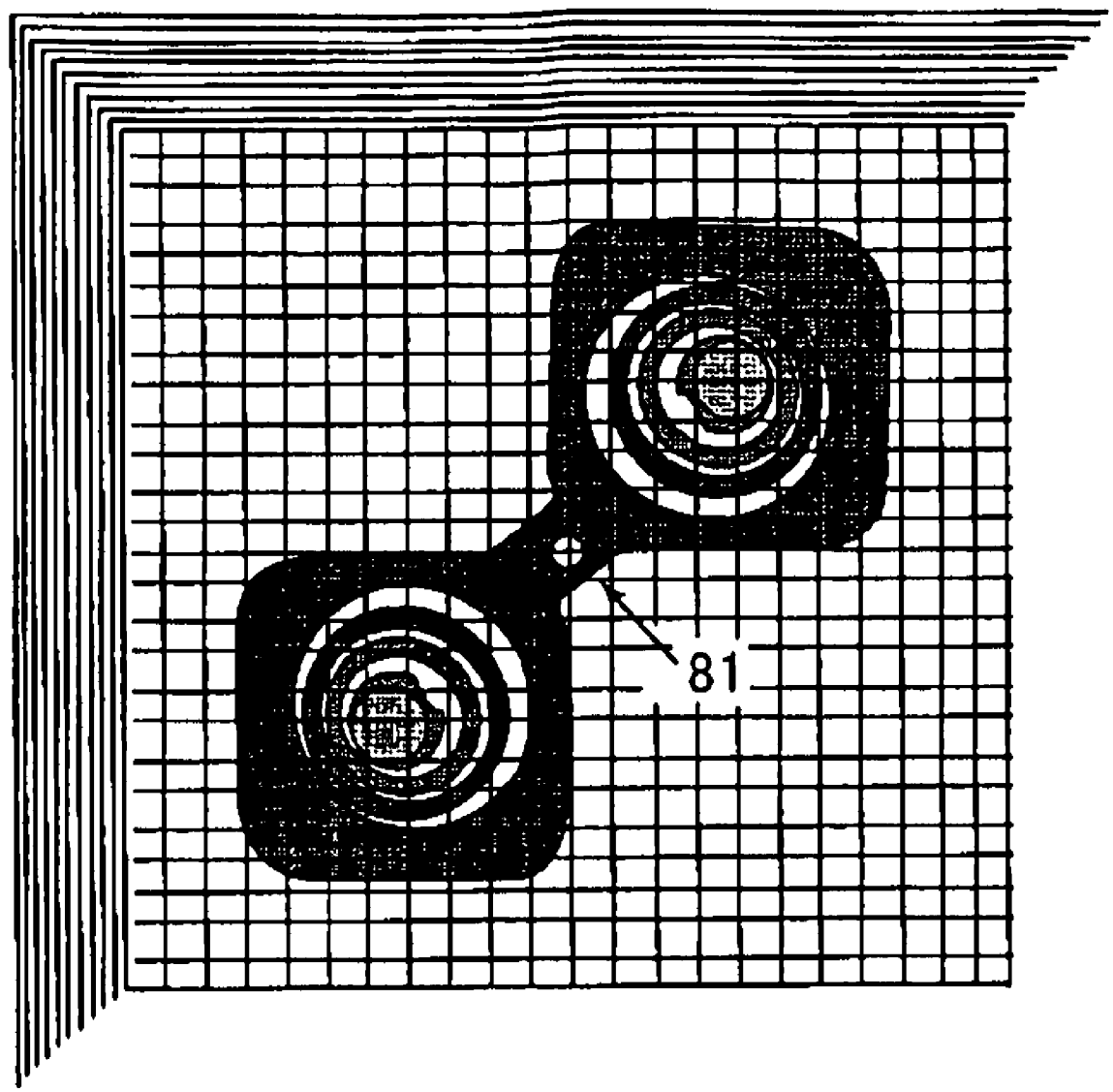
FIG. 13 is an explanatory view showing a result of evaluation of piled up foot parts of the projected pixel when there is an adjacent pixel in a diagonal direction.

FIG. 13 is a contour drawing when the area ratio is equal to 0.64. The ratio of the piled up foot parts (as shown by the reference numeral 81 in FIG. 13) is equal to 15%. Further, when the area ratios are equal to 0.0, 0.17, 0.34, and 0.92, the ratios of the piled up foot parts are equal to 15%, 19%, 17%, and 39%, respectively. Excluding the result obtained from the area ratio equal to 0.92, the ratios of the piled up foot parts are less than 25% of the above example. Accordingly, the differentiation between the adjacent pixels is clearer than the differentiation of the above described example. Thus, the image quality is better.

As shown in FIG. 13, a gap (area where the illuminance is weak) can be found between the two projected pixel profiles.

This is caused as described below. First, the incident light is condensed by the micro-lenses 3 so as to be smaller than a pixel size. If the condensed light is projected onto the screen 67 (FIG. 8) where this (this position) is determined as an object plane of the projection lens 61, it is possible to project the condensed light as an image smaller than the image projected where the object plane of the projection lens 61 is determined as a pixel plane. In this way, the image is projected, smaller than the pixel size of the spatial optical modulator. Accordingly, it is possible to realize high definition of the image. Accordingly, without producing a small size pixel, an effect can be obtained similar to a case such that the small size pixel is produced. Hereinafter, such a small size pixel is referred to as "reduced pixel".

As for the projected image of the reduced pixel, for example, in the spatial optical modulator, even an entirely white image where all of the pixels are in the bright state is recognized as an image (regularly) including a gap by an observer.

However, even the projected image including a gap as described above can be projected as a gapless image if a pixel shifting device is utilized, regularly shifting a light path of light flux into the projector (Drawing is omitted. See Japanese Laid-Open Patent Application Publication No. 2002-174852.).

Seventh Embodiment

Figure 14A:
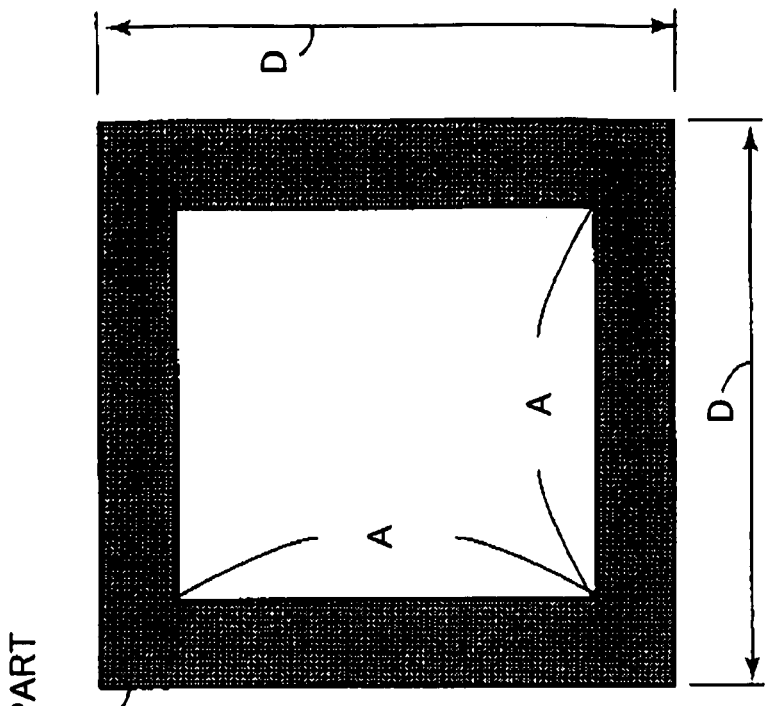
FIG. 14A is a cross-sectional view in a direction vertical to an optical axis.
Figure 14B:
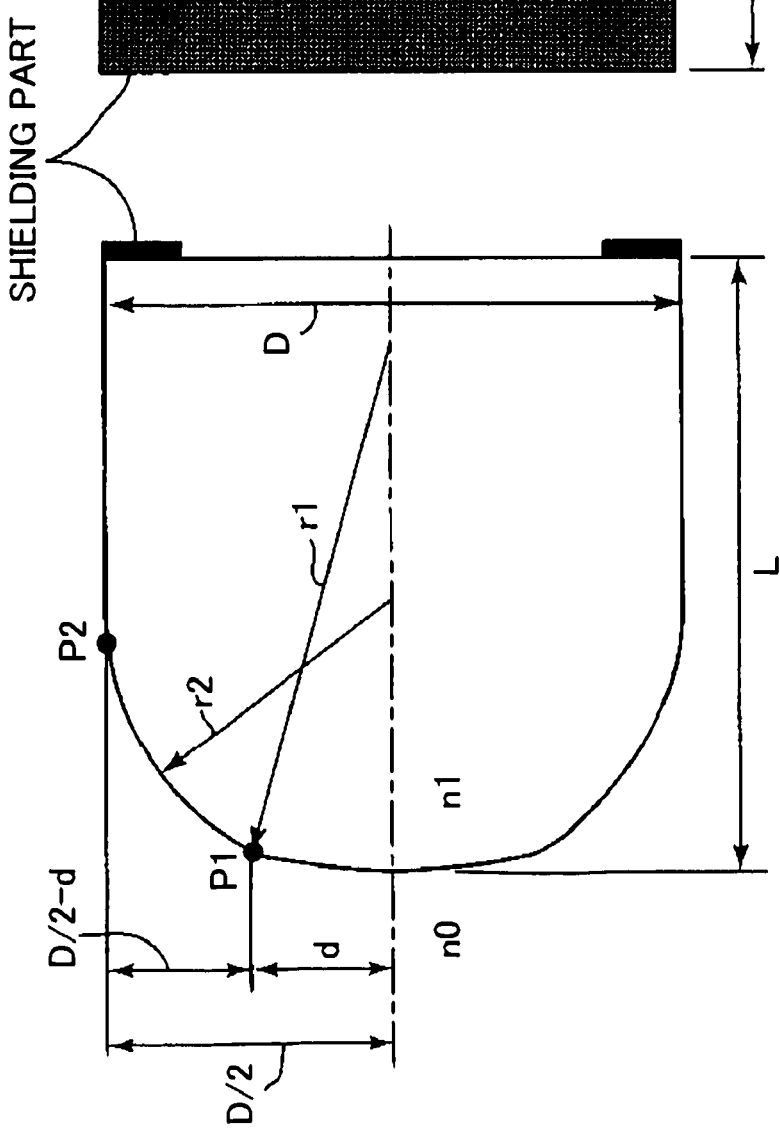

With reference to FIGS. 14A and 14B, a description is given of a seventh embodiment of the present invention.

In this description, an example is given of two F values, but the number of the F values can be three or more.

FIG. 14A is a view illustrating a shielding part viewed from a direction vertical to the optical axis. FIG. 14B is a view illustrating the shielding part viewed from the optical axis.

The refractive index of the micro-lens is equal to n1. The refractive index of an adjacent member on the incident light side is equal to n0. The member may be replaced by air.

The size of the micro-lens is equal to D. If the micro-lens is single, D is equal to the size of the micro-lens. On the other hand, in a case of a micro-lens array, D shows a pitch. The length of the micro-lens along the optical axis is equal to L.

Further, the micro-lens includes two different curvature radii r1 and r2. The first curvature radius r1 is in effect in a range d against a half of the pitch, i.e., D/2. The second curvature radius r2 is in effect in a range of D/2−d.

Furthermore, the micro-lens includes a shielding part. The shielding part is a black matrix.

On a side of the shielding part, a liquid crystal layer of a spatial optical modulating element is provided (drawing is omitted). The aperture size of the shielding part is equal to A compared to the pitch of D of the micro-lens. The numerical aperture is defined as $A^2/D^2$. A focal distance f1 in the part d of the micro-lens is obtained by an equation using r1, n0 and n1:

$$f1=(n0/(n1-n0))\times r1.$$

Another focal distance f2 in the part D/2−d of the micro-lens is obtained by an equation using r2, n0 and n1:

$$f2=(n0/(n1-n0))\times r2.$$

The F numbers are defined as below, in each of the ranges of the lens including the plural focal distances according to the present embodiment. That is, in the range of radius d, the F number is defined as F1=f1/D. In the range between d and D/2, the F number is defined as F2=f2/D.

In addition, a position P1 is at an edge part of the lens having a radius r1. On the other hand, a position P2 is at an edge part of the lens having a radius r2.

The radius r1 is increased so that the lens becomes approximately flat, while the r2 is kept small so that the lens keeps a spherical shape. As described above, on the substantially flat part, the polarization state is maintained to be optimum so that the contrast ratio is improved and the light condensing function around the spherical surface is maintained.

The incident light has a lighting angle defined as θ. The light around the center is parallel to the optical axis. The position P1 is varied by d, while the position P2 fixed to the edge of the micro-lens is not changed.

When the light having a lighting angle θ is injected to the positions P1 and P2, the light is reflected by an angle according to the curvature radii and the indexes of refraction of each of the members.

Figure 15:
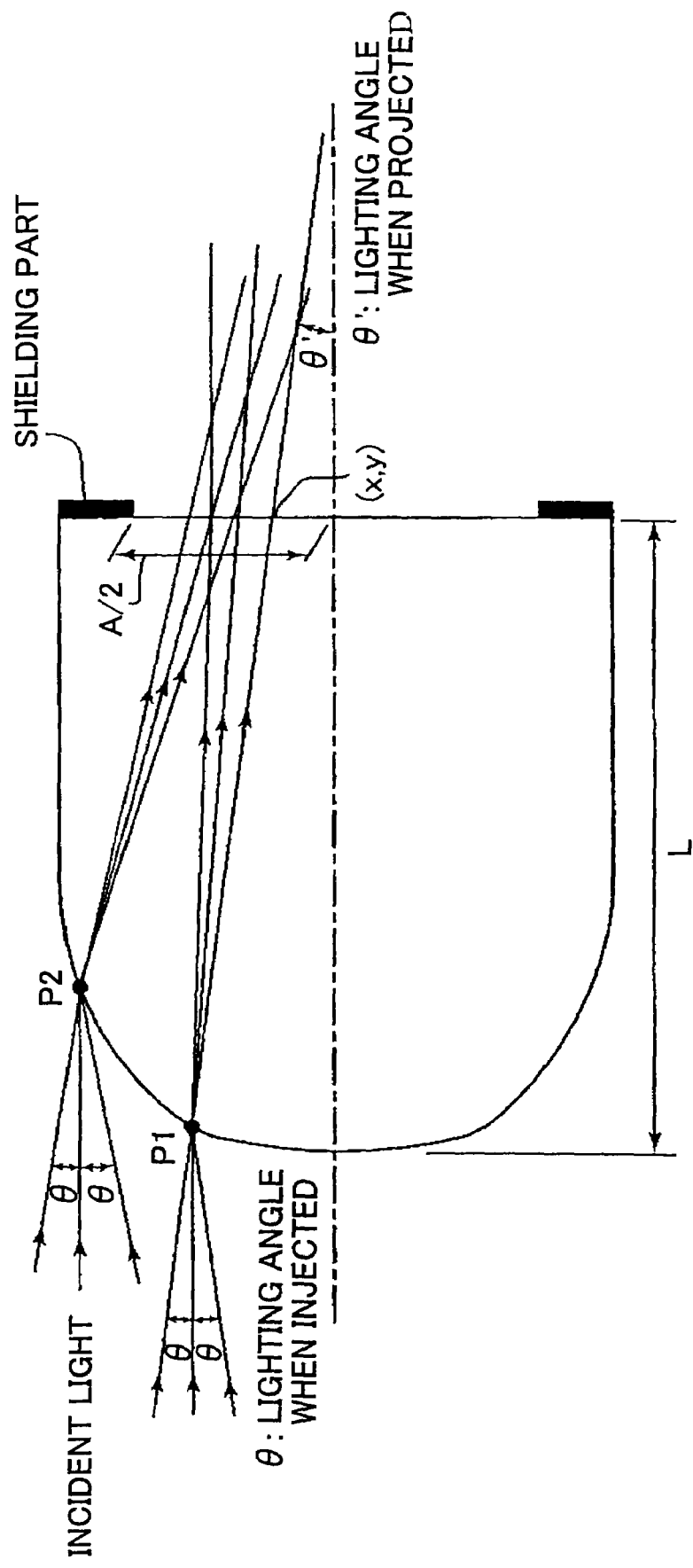
FIG. 15 is a cross-sectional pattern view illustrating a relationship between a parameter and efficiency of an optical utilization on a configuration of the lens elements used in the embodiment of the present invention.

If the parameters are properly determined, as shown in FIG. 15, the reflected light is projected from the micro-lens and injected into the liquid crystal layer without being shielded by the shielding part.

However, the light is shielded by the shielding part depending on the parameters, and thus, the efficiency of optical utilization is decreased.

Now, it is determined as:
n0=1 (air)
n1=1.517
D=14 μm
L=30 μm
A=13 μm
(These are fixed.)
r1=30 through 100 μm
r2=10 through 30 μm
d=1 through 6 μm
(These are variable.)
θ=7°
(θ is fixed.)

Then, the ray tracing calculation is performed.

Finally, the coordinates (x, y) are obtained where the light reaches at an end part of the micro-lens.

When a length between the optical axis and the coordinates (x, y) is less than the aperture size, the light is not shielded, and thus, projected through the micro-lens. Further, a lighting angle θ' when the light is projected through the micro-lens is also obtained.

As for the light which is not shielded, and thus projected through the micro-lens, the light path thereof is sometimes shielded by the following optical system.

In a case such that a projection lens is provided on a light projection side of the micro-lens (drawing is omitted), if θ' is small compared to the F value of the projection lens, the light reaches the following screen. However, in a reverse case, the light is shielded by the projection lens.

As shown in FIG. 15, the ray tracing is performed on six rays. Then, the parameter (finally the F value) is evaluated by how many light rays pass through. It should be noted that the light rays are projected in the diagonal direction viewed from the optical axis of the micro-lens. This is because the light path in the diagonal direction is the longest. The numerical aperture is equal to 86%. The F value of the projection lens is equal to 2. The result is shown in FIG. 18.

In FIG. 18, the condition where more than four light rays pass through is such that $F_1$ is equal to or greater than 3.4, and $F_2$ is equal to or greater than 2.3 and equal to or less than 4.8.

As for the upper limit of $F_1$, since it may be a completely flat surface, the upper limit of $F_1$ is not laid down.

The number of light rays passing through corresponds to efficiency of the optical utilization, i.e., equal to or greater than 67%. The light condensing function is taken into consideration.

From the examination in respect to the above described contrast ratio, the curvature radius of the micro-lens is found to have a relationship with the contrast ratio as shown in FIG. 16.

That is, the greater the curvature radius is, the more the contrast ratio is improved. This can be approximated by a natural logarithm ln.

$$\text{(The Contrast Ratio)} = a \times \ln(r) + b$$

In the equation, a and b are coefficients depending on the optical system. In the example of FIG. 16, a=830 and b=−1,040. Here, r can be replaced by the F value.

For example, the contrast ratio of an arbitrary r or F value is obtained from the graph. In the micro-lens including two different F values according to the present invention, the contrast ratio is in a range between the contrast ratio obtained when the micro-lens is entirely $F_1$ and the contrast ratio obtained when the entire micro-lens is entirely $F_2$.

In the range, the contrast ratio depends on the area ratio between the areas where $F_1$ is effective and where $F_2$ is effective. That is, the contrast ratio depends on the area ratio between an area S1 where $F_1$ is effective: $S1=d^2\Pi$ (Π is the ratio of the circumference of a circle to its diameter) and an area S2 where $F_2$ is effective: S2=D2−S1. Moreover, when these are expressed by a ratio against the entire area of the micro-lens: $S'1=S1/D^2$, and $S'2=S2/D^2$. Accordingly, the contrast ratio CR of the micro-lens including two different F values is: $CR(F_1) \times S'1 + CR(F_2) \times S'2$.

The contrast ratio (r1 and r2) shown in FIG. 18 is obtained where a=1 and b=0.

Accordingly, without depending on the value of the optical system, a comparison can be performed. Further, the contrast ratio (r1) and the contrast ratio (r2) are also shown.

It can be found that the contrast ratio (r1 and r2) is in the range between the contrast ratio (r1) and the contrast ratio (r2).

In the cases of F values where the number of the light rays passing through is not small, the contrast ratio is also not small (equal to latter half of 2 or more than 3).

Any of the efficiency of optical utilization, the light condensing function, and the contrast ratio is excellent.

Such a micro-lens, as described above, can be produced in the same way as the method where the flat part is produced without polishing, i.e., the method including the steps of producing a photomask having a desired flat part, spreading resist by a spin coater on a substrate where the micro-lens is provided, and patterning the resist by lithography.

According to at least one of the embodiments of the present invention, the micro-lens array includes minute optical elements. Each of the minute optical elements is a transmission lens element having a curved surface including a substantially flat part. The curved surface is convex. Accordingly, the change of the polarization state can be reduced by the flat part. The curved surface maintains a light condensing function.

According to at least one of the embodiments of the present invention, the micro-mirror array includes minute optical elements. Each of the minute optical elements is a reflection mirror element having a curved surface including substantially a flat part. The curved surface is concave. Accordingly, the change of the polarization state can be reduced by the flat part. The curved surface maintains a light condensing function.

According to at least one of the embodiments of the present invention, the change of the polarization state can be reduced in the transmission micro-lens array. Moreover, it is possible to improve the efficiency of optical utilization since the difference of the refractive indexes is kept small so that the optical loss due to the reflection on the interface can be reduced. Furthermore, with the flat layer, it becomes easy to install the spatial optical modulator.

According to at least one of the embodiments of the present invention, the change of the polarization state can be reduced in the reflection micro-lens array. Moreover, the light condensing feature is improved so as to improve the efficiency of optical utilization. Furthermore, with the flat layer, it becomes easy to install the spatial optical modulator.

According to at least one of the embodiments of the present invention, optimum F values are predetermined so as to further improve the contrast ratio and the efficiency of optical utilization, and maintain the light condensing function.

According to at least one of the embodiments of the present invention, the projector includes the pixel shifting device for realizing a high contrast ratio, high efficiency of optical utilization and high-definition of the image.

Further, the present invention is not limited to these embodiments, but variations and modifications may be made without departing from the scope of the present invention.

The present application is based on Japanese Priority Application No. 2005-171151 filed on Jun. 10, 2005, with the Japanese Patent Office, the entire contents of which are hereby incorporated by reference.

The invention claimed is:

1. A micro-optical device, comprising:
a plurality of minute optical elements each having a curved surface operable to condense incident light, said minute optical elements arranged at constant intervals, wherein the curved surface is expressed by two or more F values,
wherein each of the minute optical elements is a reflection mirror element having the curved surface including a substantially flat part, wherein said curved surface is concave.

2. The micro-optical device as claimed in claim 1, further comprising a translucent flat layer obtained by laminating a translucent member on the concave curved surface, and flattening a surface of the translucent member.

3. A spatial optical modulator for performing a spatial optical modulation on light by a unit of one pixel in response to image information by utilizing the micro-optical device as claimed in claim 1 and for projecting the light as image light, wherein each of the minute optical elements is adjusted to a pixel position.

4. A projector utilizing the spatial optical modulator as claimed in claim 3, comprising a projection device configured to project the image light onto a screen, said image light projected from the spatial optical modulator.

5. The projector as claimed in claim 4, further comprising a pixel shifting device configured to shift a light path of a light flux projected from the spatial optical modulator.

6. A micro-optical device, comprising:
a plurality of minute optical elements each having a curved surface operable to condense incident light, said minute optical elements arranged at constant intervals, wherein the curved surface is expressed by two or more F values, wherein each of the minute optical elements is a transmission lens element having the curved surface including a substantially flat part at a center of the transmission lens element, wherein said curved surface is convex; and
a translucent flat layer on the convex curved surface having the substantially flat part, wherein a member made of a material different from a material of the minute optical elements is provided between the translucent flat layer and the minute optical elements.

7. A spatial optical modulator for performing a spatial optical modulation on light by a unit of one pixel in response to image information by utilizing the micro-optical device as claimed in claim 6 and for projecting the light as image light, wherein each of the minute optical elements is adjusted to a pixel position.

8. A projector utilizing the spatial optical modulator as claimed in claim 7, comprising a projection device configured to project the image light onto a screen, said image light projected from the spatial optical modulator.

9. The projector as claimed in claim 8, further comprising a pixel shifting device configured to shift a light path of a light flux projected from the spatial optical modulator.

10. A micro-optical device, comprising:
a plurality of minute optical elements each having a curved surface operable to condense incident light, said minute optical elements arranged at constant intervals, wherein the curved surface is expressed by two or more F values,
wherein each of the minute optical elements is a transmission lens element having the curved surface including a substantially flat part at a center of the transmission lens element, wherein said curved surface is convex, and
wherein the transmission lens element includes two of the F values, wherein a first F value $F_1$ is equal to or greater than 3.4, wherein a second F value $F_2$ is equal to or greater than 2.3 and equal to or less than 4.8, and wherein $F_1$ is greater than $F_2$.

11. A spatial optical modulator for performing a spatial optical modulation on light by a unit of one pixel in response to image information by utilizing the micro-optical device as claimed in claim 10 and projecting the light as image light, wherein each of the minute optical elements is adjusted to a pixel position.

* * * * *